United States Patent
Estecha

(10) Patent No.: US 9,677,545 B2
(45) Date of Patent: Jun. 13, 2017

(54) LOCKING ARRANGEMENT FOR WIND TURBINES

(71) Applicant: ALSTOM Renewable Technologies, Grenoble (FR)

(72) Inventor: Santiago Claramunt Estecha, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 1001 days.

(21) Appl. No.: 13/911,002

(22) Filed: Jun. 5, 2013

(65) Prior Publication Data

US 2013/0330192 A1 Dec. 12, 2013

Related U.S. Application Data

(60) Provisional application No. 61/682,610, filed on Aug. 13, 2012.

(30) Foreign Application Priority Data

Jun. 11, 2012 (EP) .................................... 12382236

(51) Int. Cl.
 *F03D 11/00* (2006.01)
 *F03D 80/00* (2016.01)
(52) U.S. Cl.
 CPC ............... *F03D 11/00* (2013.01); *F03D 80/00* (2016.05); *F05B 2260/30* (2013.01); *Y02E 10/72* (2013.01)
(58) Field of Classification Search
 CPC .... F03D 7/0244; F03D 7/0248; F03D 7/0268; F03D 11/00; F03D 11/80; F05B 2260/30; F05B 2260/301; F05B 2260/90; F05B 2260/902; Y02E 10/722

USPC ............ 416/146 R, 153, 154, 169 R, 220 R, 416/220 A
See application file for complete search history.

(56) References Cited

U.S. PATENT DOCUMENTS

2010/0021299 A1* 1/2010 Aarhus .................. F03D 1/003 416/31
2011/0135481 A1* 6/2011 Koronkiewicz ........ F03D 1/003 416/220 R

FOREIGN PATENT DOCUMENTS

| CN | 201843736 U | 5/2011 |
|---|---|---|
| EP | 1291521 | 3/2003 |
| EP | 2290228 | 3/2011 |
| EP | 2420670 | 2/2012 |
| WO | WO 2005/090780 | 9/2005 |
| WO | WO 2008/059088 | 5/2008 |
| WO | WO 2008/155053 | 12/2008 |
| WO | WO 2010/102967 | 9/2010 |

OTHER PUBLICATIONS

Machiine translation of CN 201843736, May 25, 2011.*

* cited by examiner

*Primary Examiner* — Christopher Verdier
(74) *Attorney, Agent, or Firm* — Dority & Manning, P.A.

(57) ABSTRACT

A locking arrangement includes at least a rotatable part, a stationary part with respect to the first part, and a locking member having locking protrusions. At least one working plane passing through the locking protrusions is defined in a locking position where compression forces are concentrated which are reaction forces to external forces tending to rotate the parts relative to each other. The parts have locking protrusions defining gaps for receiving the locking protrusions in the locking position for preventing the parts from being rotated to each other.

11 Claims, 2 Drawing Sheets

LOCKING ARRANGEMENT FOR WIND TURBINES

This application claims the benefit of European Patent Application EP 12382236.3 filed Jun. 11, 2012 and U.S. Provisional Patent Application Ser. No. 61/682,610 filed Aug. 13, 2012, the disclosures of which are hereby incorporated by reference in their entirety for all purposes.

TECHNICAL FIELD

A locking arrangement for preventing at least one part to be rotated relative to at least another part around an axis of rotation in wind turbine applications.

A wind turbine provided with such a locking arrangement.

BACKGROUND

Within the field of wind turbine applications, temporary locking of movable parts is very important, particularly temporary locking of parts such as the rotor with respect to the stator, the blades with respect to the nacelle, etc., in a wind turbine.

Positive locking systems in wind turbine rotor braking devices should be provided according to current guidelines for certification of wind energy plants. This means that a mechanical interlocking should be provided to lock rotating parts in wind turbines for repair and/or maintenance operations and in general for purposes where such parts must be locked against rotation. In this respect, for example frictional brakes and the like are not allowed according to these guidelines.

The use of locking arrangements for locking rotatable parts against rotation in wind turbines, such as the rotor, is known in the art. Such locking arrangements include one or more locking pins that are fixedly arranged, for example, to the stator of the wind turbine generator. When service activities are required in the wind turbine, a brake assembly is actuated to stop the wind turbine in operation. Once the wind turbine generator is stopped, the locking arrangement can be then activated to lock the rotor against rotation. The activation of the locking arrangement is carried out by driving a locking member or locking pin into a corresponding locking gap that is usually formed in the rotor. Driving of the locking pin can be carried out manually or hydraulically along the axis of the locking pin. The axis of the locking pin is substantially parallel to the rotor axis. Once the locking pin is inserted into a target locking hole, the rotor is prevented from being rotated relative to the stator and service activities can take place safely.

The main problem of the above method is the large tolerances existing in the relative position of the locking pins and the locking holes when in the locking position. This further results in alignment problems of the locking pins and the corresponding locking holes.

Another problem with known locking arrangements is that wind turbines are currently becoming bigger in order to produce more energy. This involves increased dimensions of the generator such that the locking pins are also bigger. Since the locking pins must be manufactured to withstand the requirements of operating within harsh working conditions of the wind turbine, costs become undesirably high. This also applies to the actuating mechanisms for driving the locking pins into and out of the locking position which need to be dimensioned in order to withstand high loads.

In addition, the increased dimensions of the wind turbines and parts thereof have led to increased loads on the locking arrangement. Consequently, concentration of shear forces has become an important issue. Alternative materials for the locking arrangements or the increase in their size are solutions that are not useful for withstanding the extremely high loads involved in current wind turbines. Attempts have been made to provide several locking pins. However, costs and misaligning problems still remain.

EP1291521 discloses a locking arrangement for a wind turbine rotor. The locking arrangement in this case comprises an axially movable locking pin that is arranged on the nacelle structure and corresponding locking gaps formed in the wind turbine rotor. The locking pin has a tapered end for compensating for misalignments and plays into the holes. Due to the location and the small dimensions of the working plane of the locking pin where shear forces are concentrated, extremely high stresses are present resulting in a highly potential risk of failure of the locking pin when the locking arrangement is in a locking position.

Document WO2008059088 discloses an adjustable, self-aligning rotor locking device for preventing the hub from being rotated relative to the wind turbine nacelle. The rotor locking device includes locking pins fixed to the nacelle and actuation means for driving the locking pin axially in relation to at least one corresponding hole formed in the hub. In this case, the location and the small dimensions of the working plane of the locking pin where shear forces are concentrated is the same as the above document such that extremely high stresses are present with a resulting potential risk of failure of the locking pin.

Many other locking arrangements have been provided having in common the location and the small dimensions of the working plane of the locking pin where shear forces are concentrated. For example, documents WO2010102967, WO2005090780 and WO2008155053 all describe locking arrangements for wind turbine applications where a locking pin is movable in a direction towards a locking gap for locking the parts against rotation.

Due to the fact that the locking pin is subjected to high loads when in the locking position and that said loads are concentrated on a small working plane of the locking pin, loads concentrated therein result in that the locking pin may be likely to deform, crack or break when in the locking position. In addition, it also remains difficult to compensate for radial misalignments in prior art locking arrangements.

SUMMARY

The above disadvantages have been overcome by the present locking arrangement of the present disclosure as well as by a wind turbine having such locking arrangement. Advantageous embodiments are defined in the dependent claims.

A locking arrangement is provided for preventing at least a first part to be rotated relative to at least a second part around an axis of rotation in a wind turbine when in a locking position in which one part is prevented from being rotated relative to the other part. The first and second parts may be, for example, the stator or the rotor in a wind turbine. Other rotatable and/or stationary parts in wind turbine applications are not ruled out for the present locking arrangement.

Specifically, the present locking arrangement includes a locking member in which at least one working plane is defined. In such working plane, compression forces are concentrated when in the locking position. Compression forces in the working plane are reaction forces generated in response to external forces tending to rotate said first and second parts relative to each other when they are in the locking position.

The provision of a locking member having defined at least one working plane where compression forces are concentrated when in the locking position allows an important improvement on the strength behaviour to be achieved. A multiplicity of mutually parallel working planes can be defined within the locking member when in the locking position.

In some embodiments, the locking member is an element having at least one locking protrusion. This locking protrusion includes the working plane when in the locking position. In other words, although the working plane may pass through other elements of the locking arrangement such as the protrusion of the second part, the working plane mainly passes through the locking member.

The locking protrusion is configured, e.g. in size and shape, to be suitably received into a corresponding gap defined between said first and second parts of the wind turbine. The locking protrusion may be fully received into the gap defined between the first and second parts or it may be partly received therein. In any case, the insertion depth of the locking protrusion into the gap defined between the first and second parts is sufficient for suitably locking the first and/or second parts against rotation with respect to one another and in a way that at least one working plane is defined where compression forces are concentrated.

It is preferred that the locking member includes a parallelepiped elongated element. However, different geometries are not ruled out as long as said working plane where compression forces are concentrated is defined in said locking position.

The first part of the locking arrangement may be provided with at least two locking protrusions and the second part may be provided with at least one corresponding locking protrusion. The locking protrusion of the second part may be such that it projects between the locking protrusions of the first part. Gaps are thus defined between said locking protrusions of the parts. The first and second parts are prevented from being rotated relative to each other when the locking protrusions of the locking member are inserted into the gaps. In such position, the working plane is defined where compression forces are concentrated.

In a preferred embodiment of the present locking arrangement, the working plane is at least substantially parallel to the major dimensions of at least one of the locking protrusions of the locking member, or at least substantially parallel to the major dimensions of at least one of the locking protrusions of the first part or at least substantially parallel to the major dimensions of the locking protrusion of the second part. In addition, the working plane may be at least substantially parallel to the major dimensions of several of the above locking protrusions.

The major dimension of a locking protrusion refers to the larger surface thereof. For example, in the case of locking members having an elongated parallelepiped geometry, the major dimension is any of the larger faces thereof so the working plane in this case is any of the geometric planes arranged parallel to said larger surfaces. The working plane may also include any of the larger faces of the locking protrusion.

In some specific cases, the locking protrusion or protrusions of at least one of the locking member, the first part and the second part could have at least one inclined surface.

The present locking arrangement may be further provided with an actuator. The actuator is intended for driving the locking member into and out of the locking position. Such actuator may be mechanical, electric, hydraulic or any other suitable type.

In preferred embodiments, the locking member is movable in a direction perpendicular to the axis of rotation of said first and second rotatable parts of the wind turbine.

A wind turbine is herein provided including a rotor having a rotor portion and a stator having a stator portion. The rotor and stator portions are complimentarily shaped such that both define a locking gap for receiving at least one portion of a locking member according to the above locking arrangement. In this case, the locking member may be mounted radially or axially into rotor and stator flange portions. In any case, the locking member may be mounted close to the rotor and/or the stator flange portions.

Additional objects, advantages and features of embodiments of the present locking arrangement will become apparent to those skilled in the art upon examination of the description, or may be learned by practice of the present disclosure.

BRIEF DESCRIPTION OF THE DRAWINGS

Particular embodiments of the present locking arrangement will be described in the following by way of non-limiting examples, with reference to the appended drawings, in which.

DETAILED DESCRIPTION OF EMBODIMENTS

Figure 1:
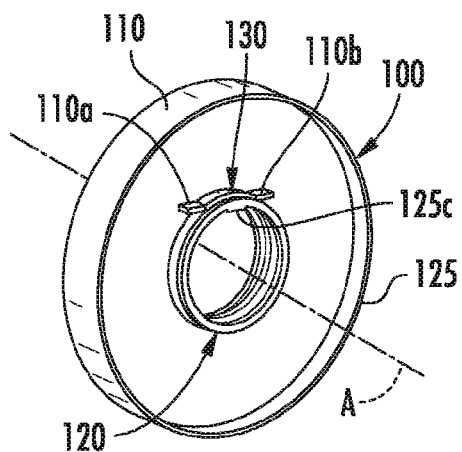
FIG. 1 is a perspective view of a first embodiment of the present locking arrangement showing the first part of the locking arrangement, the second part of the locking arrangement and the locking member of the locking arrangement in a locking position in which the first and second parts are prevented from being rotated relative to each other.
Figure 2:
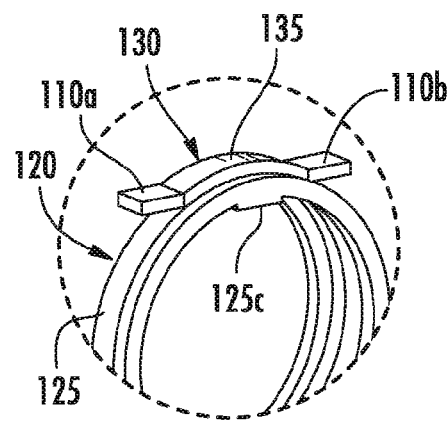
FIG. 2 is an enlarged detail view of the locking arrangement in FIG. 1.
Figure 3:
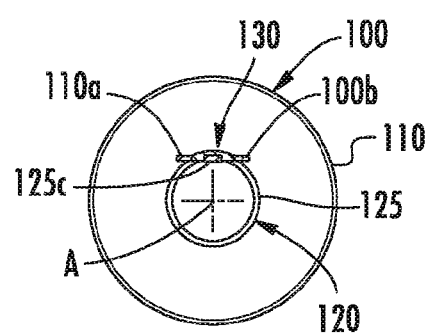
FIG. 3 is a front elevational view of the locking arrangement in FIG. 1.

Two embodiments of the present locking arrangement are disclosed herein with reference to the above figures. Both embodiments of the present locking arrangement are described and depicted in a locking position and in an unlocking position.

Like reference numerals refer to like parts throughout the description of several views of the drawings.

Figure 5:
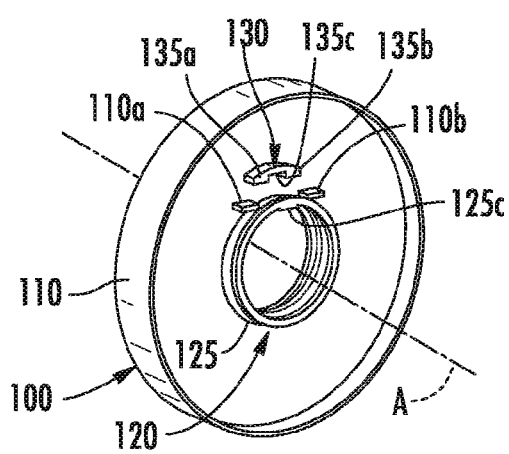
FIG. 5 is a perspective view of the embodiment of the present locking arrangement with the locking member in an unlocking position in which the first and second parts are allowed to be rotated relative to each other.

According to the figures, the locking arrangement is indicated as a whole at 100. In said two embodiments, the locking arrangement 100 is provided for preventing a first part such as a wind turbine rotor 110 to be rotated relative to a second part such as a wind turbine stator 120. In operation, and in the unlocking position as shown in FIGS. 5-7, the wind turbine rotor 110 can be rotated relative to the wind turbine stator 120 around an axis of rotation A when in the unlocking position.

The embodiments of the locking arrangement 100 include the above parts 110, 120 and a locking member 130. One specific but non limiting example of the locking member 130 is shown in FIGS. 2, 6 and 10, 11.

Figure 4:
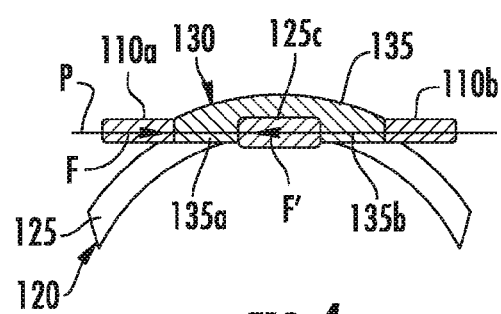
FIG. 4 is an enlarged sectional view of the locking arrangement in FIG. 1.
Figure 6:
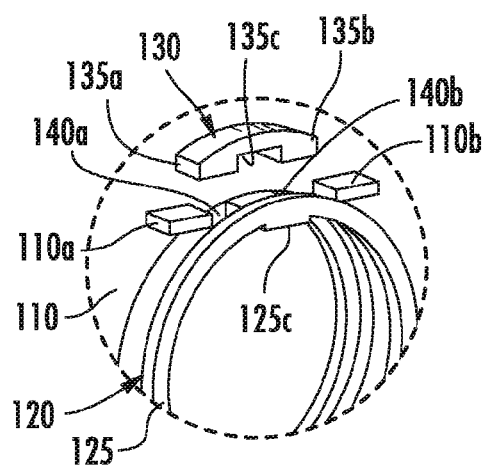
FIG. 6 is an enlarged perspective view of the locking arrangement in FIG. 5.
Figure 7:
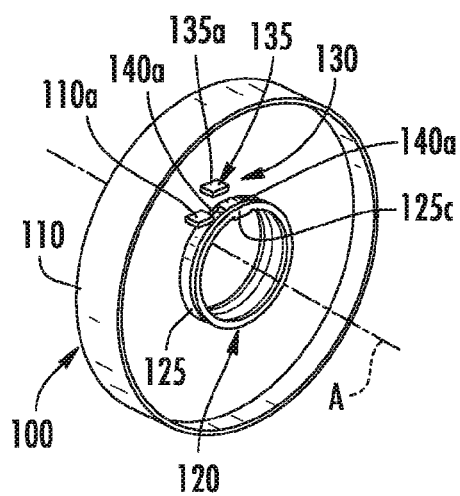
FIG. 7 is a perspective view of a second embodiment of the present locking arrangement with the locking member in an unlocking position in which the first and second parts are allowed to be rotated relative to each other.
Figure 8:
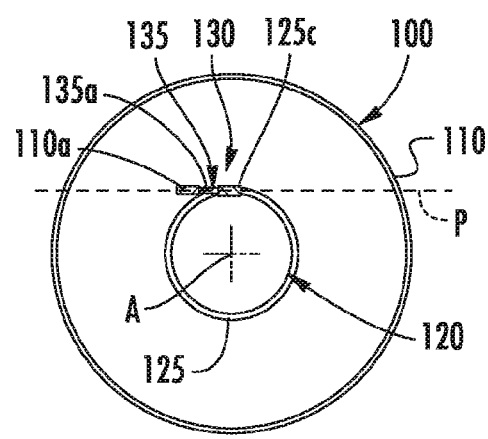
FIG. 8 is a front elevational view of the locking arrangement in FIG. 7 with the locking member in a locking position in which the first and second parts are prevented from being rotated relative to each other.
Figure 9:
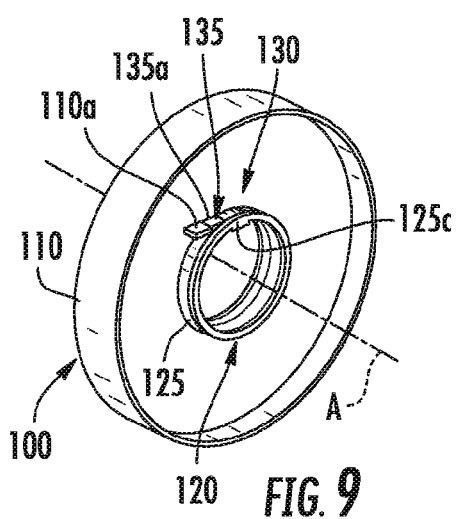
FIG. 9 is a perspective view of the second embodiment of the present locking arrangement with the locking member in the locking position in which the first and second parts are prevented from being rotated relative to each other.
Figure 10:
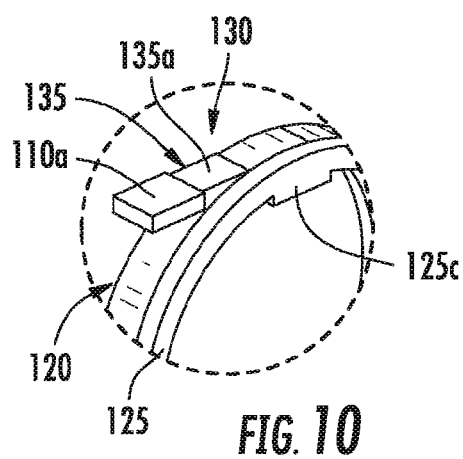
FIG. 10 is an enlarged detail view of the locking arrangement in FIGS. 8 and 9.
Figure 11:
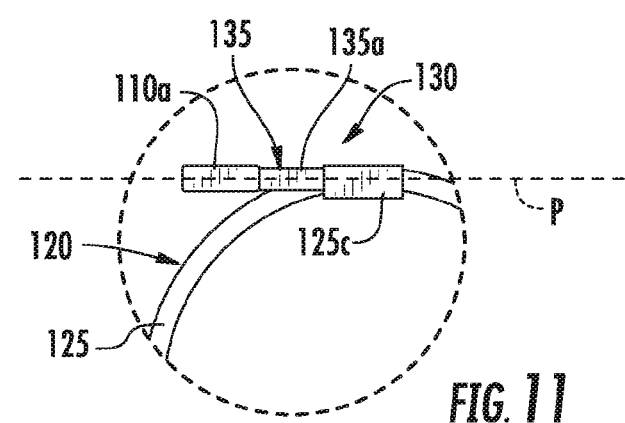
FIG. 11 is an enlarged front elevational detail view of the locking arrangement in FIGS. 8 and 9.

Referring now to FIGS. 4 and 6 of the drawings, the locking member 130 includes a locking element 135 that is defined by a substantially curved elongated parallelepiped geometry. The locking element 135 has two downwardly extending locking protrusions 135a, 135b and a corresponding central recess 135c.

The wind turbine rotor 110 includes a rotor flange portion having two locking protrusions 110a, 110b.

The wind turbine stator 120 includes a stator hub 125 having a locking protrusion 125c. In operation, that is when in the unlocking position, the rotor 130 can be rotated relative to the stator hub 125 such that the locking protrusions 110a, 110b of the wind turbine rotor 110 rotate above the locking protrusion 125c of the stator hub 125.

Between the locking protrusions 110a, 110b of the wind turbine rotor 110 and the locking protrusion 125c of the stator hub 125 corresponding gaps 140a, 140b are defined as shown in FIG. 6. The gaps 140a, 140b are suitable for receiving the locking protrusions 135a, 135b of the locking member 130.

In the locking position of the locking member 130, shown in FIGS. 1-4, the locking protrusions 135a, 135b of the locking member 130 are inserted into the gaps 140a, 140b.

In such locking position, the wind turbine rotor 110 is prevented from being rotated relative to the wind turbine stator 120. In this condition, that is, when the wind turbine rotor 110 is locked against rotation, a working plane P is defined in the locking member 130 as shown in FIG. 4. A working plane P or a multiplicity of mutually parallel working planes P are defined passing within the locking protrusions 135a, 135b of the locking member 130 when in said locking position. The working plane P contains compression forces F-F' as shown in FIG. 4, generated when in the locking position. Compression forces F-F' in the working plane P are reaction forces to external forces tending to rotate the wind turbine rotor and stator 110, 120 relative to each other when the wind turbine rotor 110 is locked against rotation. Said compression forces F-F' are concentrated between the protrusions 110a, 110b of the wind turbine rotor 110 and the locking protrusion 125c of the wind turbine stator 120.

The working plane P is defined in the locking member 130 when in the locking position. As shown in FIG. 4, the working plane P is parallel to the major surfaces of the locking protrusions 110a, 110 of the locking member and the major surfaces of the locking protrusion 125c of the wind turbine stator 120 and also the major surfaces of the locking protrusions 135a, 135b of the locking member 130.

It is foreseen that the locking member 130 may be fitted radially or axially relative to the wind turbine rotor or stator 110, 120.

A second embodiment is provided according to FIGS. 7-11. In this embodiment, the locking member 130 includes a locking element 135 defined by a substantially curved elongated parallelepiped geometry and provided with a single downwardly extending locking protrusion 135a.

Between the protrusions formed in the wind turbine rotor 110 and the protrusion 125c of the stator hub 125 a gap 140a is defined as shown in FIG. 7. The gap 140a is suitable for receiving the locking protrusion 135a of the locking member 130.

In the locking position of the locking member 130, shown in FIGS. 8-11, the locking protrusion 135a of the locking member 130 is inserted into the gap 140a. In this locking position, the wind turbine rotor 110 is prevented from being rotated relative to the wind turbine stator 120 in one direction such that a working plane P or a multiplicity of mutually parallel working planes P are defined passing within the locking protrusion 135a of the locking member 130 when in said locking position.

In all the embodiments disclosed herein, the wind turbine rotor 110 and the wind turbine stator 120 may be near a flange provided in a bearing joining them. This flange is a good region to place the locking arrangement since it is already reinforced as it is a stress concentration region. Additional reinforcements are thus not necessary.

Although only a number of particular embodiments and examples of the present locking arrangement have been disclosed herein, it will be understood by those skilled in the art that other alternative embodiments and/or uses and obvious modifications and equivalents thereof are possible. All possible combinations of the particular embodiments described herein are covered.

Reference signs related to drawings and placed in parentheses in a claim, are solely for attempting to increase the intelligibility of the claim, and shall not be construed as limiting the scope of the claim. Thus, the scope of the present disclosure should not be limited by particular embodiments, but should be determined only by a fair reading of the claims that follow.

The invention claimed is:

1. A locking arrangement for preventing a rotatable first part from being rotated relative to a stationary second part around an axis of rotation in a wind turbine when in a locking position, the locking arrangement comprising:
   a locking member in which at least one working plane is defined where compression forces are concentrated in the locking position, the compression forces being reaction forces to external forces tending to rotate the first part relative to the second part when in the locking position, the locking member comprising at least one locking protrusion,
   the first part comprising at least one locking protrusion, the second part comprising at least one corresponding locking protrusion, wherein a gap is defined between the locking protrusion of the first part and the corresponding locking protrusion of the second part, the gap receiving the locking protrusion of the locking member when in the locking position for preventing the first and second parts from being rotated relative to each other.

2. The locking arrangement of claim 1, wherein the locking member includes a parallelepiped elongated element.

3. The locking arrangement of claim 1, wherein the first part comprises at least two locking protrusions on opposing sides thereof, wherein the gap is defined between the at least two locking protrusions of the first part and the corresponding locking protrusion of the second part, the gap receiving the locking protrusion of the locking member when in the locking position for preventing the first and second parts from being rotated relative to each other.

4. The locking arrangement of claim 1, wherein the working plane is at least substantially parallel to the major dimensions of at least one of the locking protrusions.

5. The locking arrangement of claim 1, wherein at least one of the locking protrusions has at least one inclined surface.

6. The locking arrangement of claim 1, wherein the first part comprises a rotor in the wind turbine and the second part comprises a stator in the wind turbine.

7. The locking arrangement as claimed in claim 1, wherein the locking member is movable in a direction perpendicular to the axis of rotation of the first and second parts.

8. A wind turbine including a rotor having a rotor flange portion and a stator having a stator flange portion, the rotor and stator flange portions being complimentarily shaped such that both define the gap for receiving at least one portion of the locking member according to claim 1.

9. The wind turbine of claim 8, wherein the locking member is mounted radially into the rotor and stator flange portions.

10. The wind turbine of claim 8, wherein the locking member is mounted close to the rotor and/or stator flange portions.

11. The wind turbine of claim 8, wherein the locking member is mounted axially into the rotor and stator flange portions.

\* \* \* \* \*